United States Patent
Yellin (10) Patent No.: US 6,628,701 B2
(45) Date of Patent: Sep. 30, 2003

(54) METHOD AND APPARATUS FOR REDUCING SPREAD SPECTRUM NOISE

(75) Inventor: Daniel Yellin, Ra'anana (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/443,864

(22) Filed: Nov. 19, 1999

(65) Prior Publication Data

US 2002/0094020 A1 Jul. 18, 2002

Related U.S. Application Data

(63) Continuation of application No. 08/873,880, filed on Jun. 11, 1997, now Pat. No. 6,034,986.

(51) Int. Cl.[7] .............................................. H04B 1/707

(52) U.S. Cl. ...................................... 375/148

(58) Field of Search ................................ 375/130, 144, 375/147, 148; 370/320, 335, 342; 455/67.3

(56) References Cited

U.S. PATENT DOCUMENTS

| | | | |
|---|---|---|---|
| 4,884,284 A | | 11/1989 | Nakayama |
| 5,105,435 A | * | 4/1992 | Stilwell ...................... 375/200 |
| 5,235,612 A | | 8/1993 | Stilwell et al. |
| 5,323,418 A | | 6/1994 | Ayerst et al. |
| 5,325,394 A | | 6/1994 | Bruckert |
| 5,410,750 A | * | 4/1995 | Cantwell et al. ............. 455/306 |
| 5,428,832 A | * | 6/1995 | Nohara et al. ............... 455/296 |
| 5,469,465 A | * | 11/1995 | Birchler et al. ............. 375/346 |
| 5,506,861 A | * | 4/1996 | Bottomley ................... 370/441 |
| 5,627,855 A | | 5/1997 | Davidovici |
| 5,754,583 A | * | 5/1998 | Eberhardt et al. ........... 375/200 |
| 6,009,089 A | | 12/1999 | Huang et al. |
| 6,067,292 A | | 5/2000 | Huang et al. |

OTHER PUBLICATIONS

"Minimum Probability of Error for Asynchronous Gaussian Multiple–Access Channels"—S. Verdu—*IEEE Transaction Information Theory*—Jan. 1986 pp 85–96.

"Digital Communications"—J. G Proakis, McGraw–Hill, Third Edition, 1995.

"Multiuser Detection Techniques for Narrowband Interference Suppression"—L. Rusch and Poor—*IEEE Transactions on Communications*, vol. 43, Nos. 2–3–4, pp. 1725–1737, Feb.—Mar.—Apr. 1995.

"Linear Multiuser Detectors for Synchronous Code–Division Multiple–Access Channels"—R. Lupas and S. Verdu, *IEEE Transactions on Information Theory*, vol. 35, No. 1, Jan. 1989, pp. 123–136.

"A Family of Suboptimum Detectors for Coherent Multiuser Communications"—Z. Xie, R. Short, C. Rushforth—*IEEE Journal on Selected Areas in Communications*, vol. 8, No. 4, May 1990, 683–690.

"Spread Spectrum Multiple Access System with Intrasystem Interference Cancellation"—Tatsuro Masamura—*The Transactions of the IEICE*, vol. E71, No. 3, Mar. 1988, pp. 224–231.

"CDMA–AIC: Highly Spectrum–Efficient CDMA Cellular System Based on Adaptive Interference Cancellation."—S. Yoshida and A. Ushirokawa, *IEICE Trans.Commun.* E79–B No. 3:353–360. Mar. 1996.

(List continued on next page.)

*Primary Examiner*—Young T. Tse
(74) *Attorney, Agent, or Firm*—Kenneth J. Cool (57) ABSTRACT

Apparatus and a method for receiving spread-spectrum signals is provided. The method includes the steps of detecting a noisy user signal from a spread-spectrum signal including at least a first user signal (including data therein) and at least one pilot signal, and removing an interference effect of the pilot signal on the first user signal from the noisy user signal thereby to create a noise reduced user signal.

9 Claims, 6 Drawing Sheets

OTHER PUBLICATIONS

"Adaptive Filters in Multiuser (MU) CDMA Detection", Lim T. J. and Roy, S., Wireless Networks, J.C. Baltzer AG, Science Publishers, 1996, 12 pages.

"Serial interference cancellation method for CDMA."—Y. Li, and R. Steele, *Electronic Letters*, 30:1581–1583, Sep. 1994.

"Code–Aided Interference Suppression for DS/CDMA Communications– Part II: Parallel Blind Adaptive Implementations"—H.S. Poor and X. Wang– *IEEE Transactions on Communications*, 45: 1112–1122, Sep. 1997.

"A Spread–Spectrum Multiaccess System with Cochannel Interference Cancellation for Multipath Fading Channels."—Y.C. Yoon, et al.—*IEEE Journal on selected Areas in Communications*, 11: 1067–1075, Sep. 1993.

"Adaptive Detection for DS–CDMA", Woodward, G. and Vucetic, B.S., Proceedings of the IEEE, vol. 86, No. 7, Jul. 1998, pp. 1413–1434.

* cited by examiner

METHOD AND APPARATUS FOR REDUCING SPREAD SPECTRUM NOISE

CROSS-REFERENCE TO PREVIOUS APPLICATIONS

This application is a continuation of U.S. patent application Ser. No. 08/873,880 filed Jun. 11, 1997, now U.S. Pat. No. 6,034,986 which is incorporated by reference herein.

FIELD OF THE INVENTION

The present invention relates to spread spectrum communication systems generally and to noise reducing units in mobile handsets of such communication systems in particular.

BACKGROUND OF THE INVENTION

A conventional spread spectrum signal can be viewed as the result of mixing a narrowband information-bearing signal $i[t]$ with an informationless wideband "spreading" signal $p[t]$. If $B_i$ and $B_p$ denote the bandwidths of $i[t]$ and $p[t]$, respectively, then the "processing gain" available to the receiver is $G=B_p/B_i$. The receiver synchronizes the incoming signal to a locally generated version $p_0[t]$ of $p[t]$ and mixes the received signal with $p_0[t]$, thereby removing $p[t]$ from the signal and "collapsing" the signal to the "information bandwidth" $B_i$.

The spreading signal $p[t]$ is typically a coding sequence of some kind, such as a pseudo-random code. The United States space program initially utilized a Type 1 Reed-Muller code for deep-space communications. In many code division multiple access (CDMA) systems, the code is an M-sequence which has good "noise like" properties yet is very simple to construct.

For example, in the IS-95 standard for cellular communication, the forward channel (base to mobile units) employs, as a spreading code, the product of a 64 chip Walsh code (aimed at separating up to 64 different users per base) and a periodic PN sequence (aimed at separating the different bases). Thus, the spreading signal $p[t]$ for each user is its Walsh code combined with the current 64 chips of the PN sequence of its base station.

In order to synchronize the local version $p_0[t]$ of the spreading signal with the original version $p[t]$, the base station additionally transmits the current PN sequence via a pilot signal $z[t]$ (the pilot signal $z[t]$ is simply the current PN sequence multiplied by the all 1 Walsh code). The mobile unit then synchronizes its local code generator to the pilot signal after which the mobile unit can despread the received information bearing signals using its Walsh code and the current PN sequence.

The Walsh codes $W_i$, $I=1, \ldots 64$ are perfectly orthogonal to each other such that, in a non-dispersive transmission channel, there will be complete separation among the users even despite being transmitted at the same time and on the same transmission frequencies.

Practical channels, however, are time dispersive, resulting in multipath effects where the receiver picks up many echoes of the transmitted signal each having different and randomly varying delays and amplitudes. In such a scenario, the code's orthogonality is destroyed and the users are no longer separated. Consequently, a mobile unit, when attempting to detect only a single user, regards all other channel users (including signals from other base stations) as creators of interference. This contributes to a decrease in signal-to-noise ratio (SNR) and thus, reduces the reception quality of the mobile unit.

In the presence of multipath channels, the mobile units additionally process the informationless pilot signal to identify and track the multipath parameters of the channel. For this purpose, the mobile units include a channel estimator which detects and tracks the attenuation, denoted by channel "tap" $\hat{h}_i$, and the relative delay, denoted by $\hat{\tau}_i$, for each of the main paths. The mobile units then utilize the channel information in their detection operations.

One exemplary multipath detector is a rake receiver which optimally combines the different paths into a single replica of the transmitted signal. Rake receivers are described in detail e.g. in the book *Digital Communications* by J. G. Proakis, McGraw-Hill, Third Edition, 1995. The book is incorporated herein by reference.

A multiple-user detection scheme, such as is often used in base stations, can be viewed as interpreting the cross-talk between the signals of the users as merely a part of the multiple-input, multiple-output channel distortion. The base station accounts for this distortion during the detection process and, in general, the distortion does not translate into an SNR reduction. Therefore, it is not surprising that, with practical multipath channels, multi-user detection schemes are far superior to single-user ones.

Unfortunately, multi-user detection schemes are also significantly more complex than single-user ones. Not only does multi-user detection require (either explicitly or implicitly) processing the received signal with a bank of PN code generators (with each generator being matched to a distinct user), the outputs of this generator bank must further be processed according to some a priori criterion, such as maximum likelihood criterion, whose complexity is exponential in the number of users, or the decorrelation/minimum mean squared error (MMSE) criterion, whose complexity is quadratic in the number of users.

The article "Minimum Probability of Error for Asynchronous Gaussian Multiple-Access Channels" by S. Verdu, *IEEE Transactions on Information Theory*, January 1986, pp. 85–96, incorporated herein by reference, describes a multi-user detection scheme using the maximum likelihood criterion. The following articles, also incorporated herein by reference, describe multi-user schemes using the decorrelation/MMSE criterion:

L. Rusch and Poor, "MultiUser Detection Techniques for Narrowband Interference Suppression", *IEEE Transactions on Communications*, Vol. 43, Nos. 2–3–4, pp. 1725–1737, February–March–April 1995;

R. Lupas and S. Verdu, "Linear Multiuser Detectors for Synchronous Code-Division Multiple-Access Channels", *IEEE Transactions on Information Theory*, Vol. 35, No. 1, January 1989, pp. 123–136;

Z. Xie, R. Short and C. Rushforth, "A Family of Suboptimum Detectors for Coherent Multiuser Communications, *IEEE Journal on Selected Areas In Communications*, Vol. 8, No. 4, May 1990, 683–690;

Since the number of simultaneous channel users may be quite large, the computational burden associated with multi-user schemes prohibits their implementation in some applications, such as in mobile CDMA receivers.

U.S. Pat. No. 5,506,861 to Bottomley describes a plurality of methods for demodulating multiple CDMA signals which are similar to those presented in the book *Digital Communications* by J. G. Proakis, Chapter 15, section 15.3, but extended to the multi-path channel case. A common feature of these approaches is that they require a bank of despreaders each of which corresponds to the spreading code of a different channel user. The outputs of this bank of despreaders are then processed according to the MLSE criterion via the Viterbi algorithm or according to the decorrelation/MMSE criterion. However, a bank of despreaders is expensive in terms of complexity and power consumption. Thus, it cannot be implemented in a mobile handset. Furthermore, the Viterbi algorithm and the decorrelation/MMSE detectors are also quite complicated.

U.S. Pat. No. 5,323,418 to Ayerst describes a base station which includes an interference cancellation operation. The cancellation involves sequentially subtracting the interfering signals from the received signal in accordance with their relative power. In this manner, the effects of each user are separately removed, leaving the signal of the desired user for decoding.

U.S. Pat. No. 5,105,435 to Stilwell describes a method and apparatus for canceling user-code noise in spread-spectrum systems. Like most multi-user detection schemes, the system substantially removes the signals of the other users from the received signal, thereby producing the user signal of interest. Stilwell also indicates that, for the mobile receiver, it is enough to remove just the pilot signal out of the received signal, especially considering that the pilot signal is typically a very strong signal, significantly stronger than the user signals.

The article "Spread Spectrum Multiple Access System with Intrasystem Interference Cancellation" by Tatsuro Masamura, *The Transactions of the IEICE*, Vol. E71, No. 3, March 1988, pp. 224–231 describes an interference recovery circuit which includes a bank of units. Each unit contains a conventional despreader followed by a band pass filter and a respreader. The circuit filters out the interfering signal components from the desired signal and thus, attempts to reduce the overall distortion of the desired signal.

However, Stilwell, Ayerst and Masamura suggest canceling the user-code noise by despreading and respreading the received signal several times. These operations are computationally expensive and, therefore, the methods cannot be utilized in mobile units.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
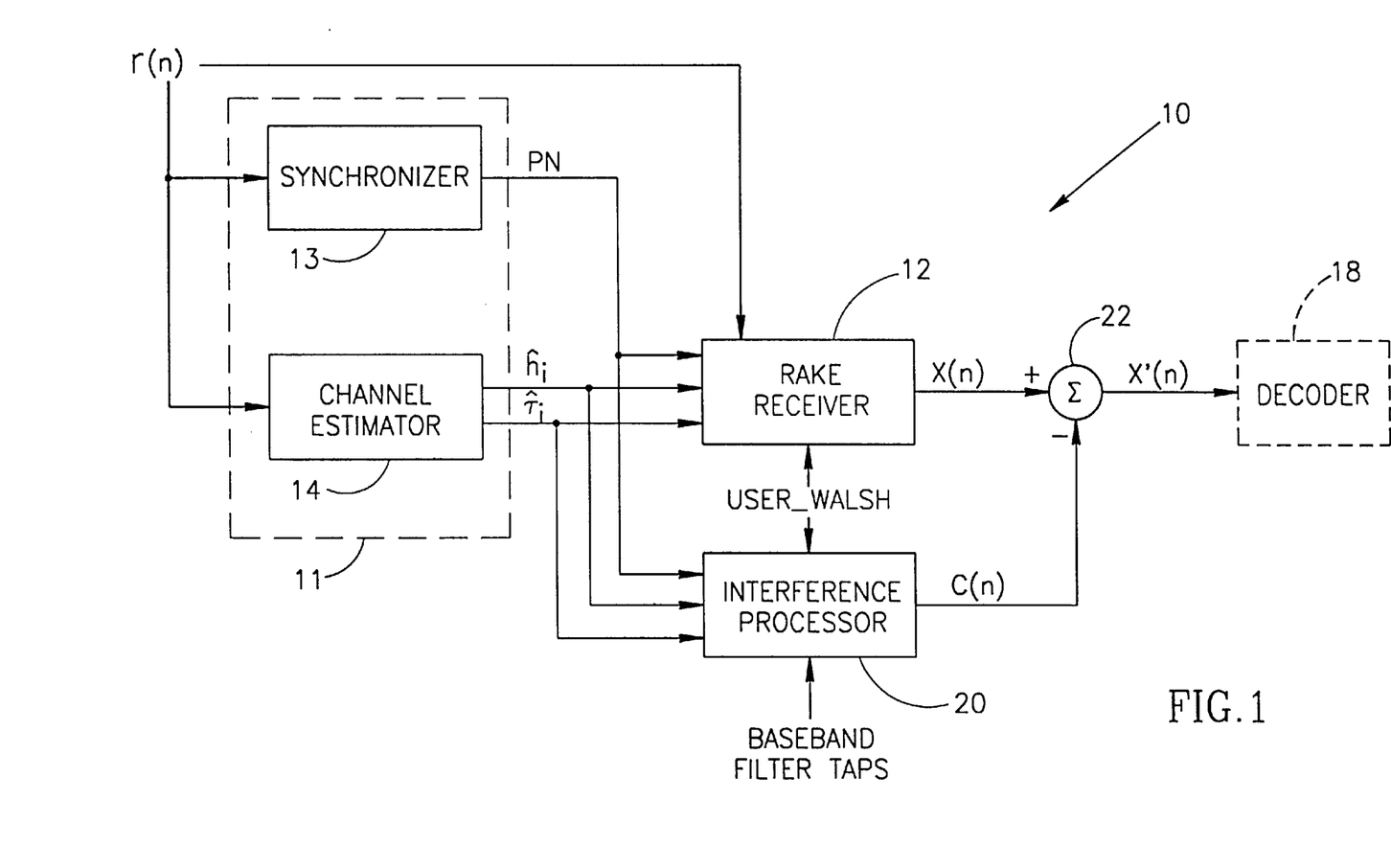
FIG. 1 is a block diagram illustration of a data detector for a mobile unit, constructed and operative in accordance with a preferred embodiment of the present invention.
Figure 2:
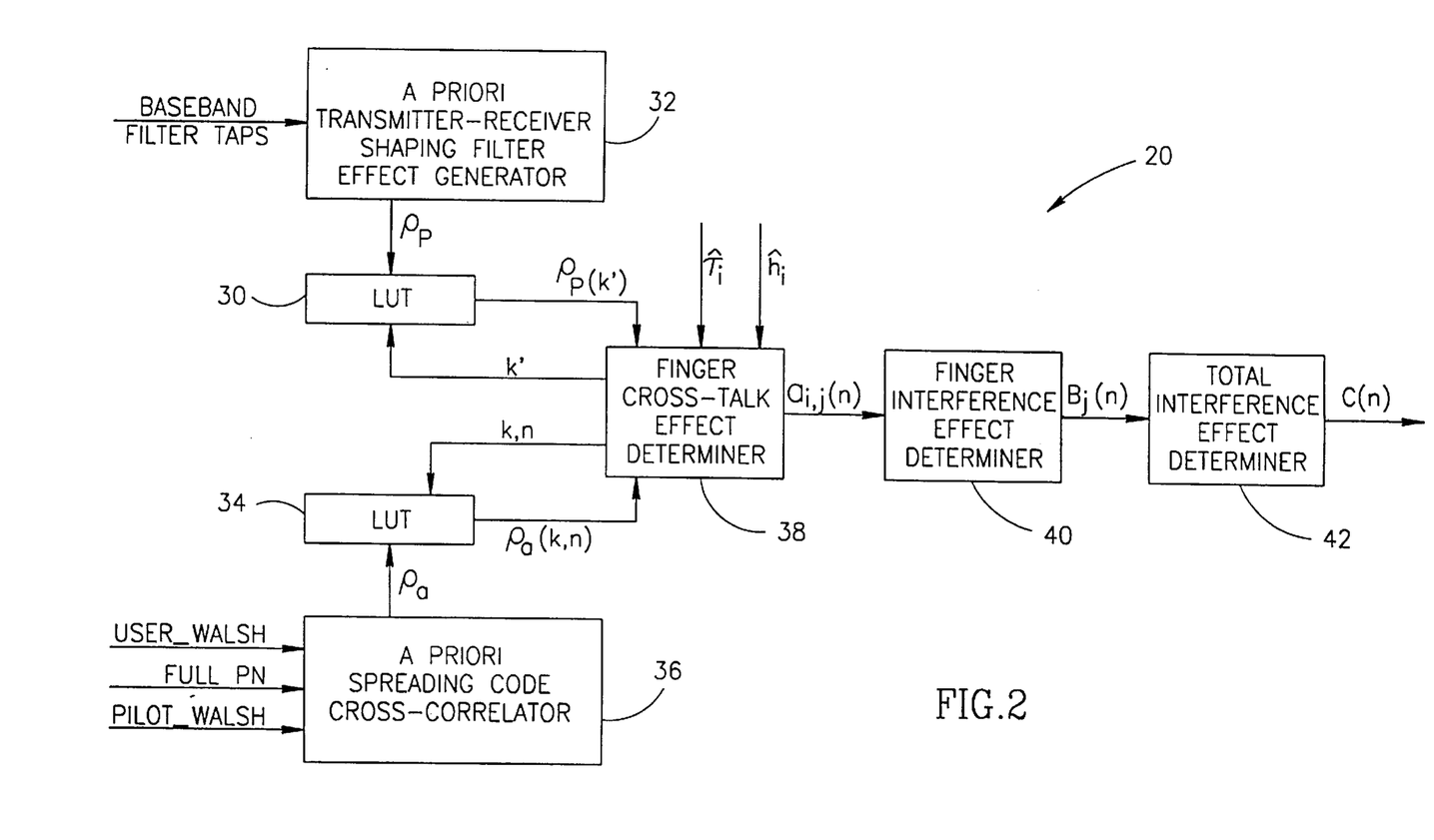
FIG. 2 is a block diagram illustration of an interference processor useful in the detector of FIG. 1.

Reference is now made to FIGS. 1 and 2 which illustrate a first embodiment of the mobile unit data detector of the present invention. FIG. 1 illustrates the detector in general and FIG. 2 illustrates the elements of an interference processor forming part of the detector of FIG. 1.

Detector 10 forms part of a mobile communication unit which, like prior art detectors, receives a signal r(n) and comprises a rake receiver 12, a pilot processor 11 and an optional decoder 18. As in the prior art, the pilot processor 11 includes a synchronizer 13 and a channel estimator 14. However, in accordance with a preferred embodiment of the present invention, detector 10 also comprises an interference processor 20 which utilizes the output of the existing channel estimator 14 and synchronizer 13.

The signal r(n) is the version of the received signal after the latter has been filtered and down converted to a baseband signal and has been sampled at rate of M samples per chip and N chips per symbol where M and N are typically integers. In the IS-95 CDMA standard, there are 64 chips per symbol n and the chip rate is $1.2288 \times 10^6$ chips per second, i.e. $T_{chip}$ is about 0.8 μsec. For simplicity, M is set to 1, i.e. upon receipt, the signal r(n) is sampled once per chip.

Synchronizer 13 synchronizes the detector to the PN sequence of the base station and provides the current PN sequence to the rake receiver 12 and the interference processor 20. Channel estimator 14 estimates the channel tap $\hat{h}_i$ and the delay $\hat{\tau}_i$ associated with each finger. Rake receiver 12 despreads the user data signal of the current user using the user's Walsh code (which is known a priori), the current PN sequence, the estimated channel taps $\hat{h}_i$ and the estimated finger delays $\hat{\tau}_i$. Rake receiver 12, shown in detail in FIG. 3A, produces the estimated user data signal x(n), sampled once per symbol.

It is noted that the received signal r(n) consists of the data signals of all of the active users (of the current base station and possibly of other, neighboring base stations) the pilot signals of at least the current base station and other interference terms caused by different noise sources in transmission, reception, etc. For the present discussion, the "pilot signal" will refer to the pilot signal of the current base station which is, by far, the strongest pilot signal received by the mobile unit.

In accordance with a preferred embodiment of the present invention, interference processor 20 determines the cross-talk interference effect c(n) of the pilot signal on the user data signal x(n). Since the power of the pilot signal is typically significantly larger than that of any other channel user (to ensure that every synchronizer 13 can synchronize to it), removing the interference effect c(n) of the pilot signal (via a subtractor 22) should considerably improve the estimated user data signal x(n). Furthermore, as described hereinbelow, the interference effect is relatively simple to calculate and thus, interference processor 20 can generally easily be implemented in a mobile handset where the computational burden must be minimized.

Subtractor 22 removes the interference effect c(n) from the rake receiver output x(n) thereby producing a new version x'(n) of the data signal. The new version x'(n) is decoded, via known methods, by optional decoder 18.

Interference processor 20 determines the cross-talk through the rake receiver 12 due to the pilot signal and from this, generates the interference effect caused by the pilot signal. The cross-talk is of the form $\text{Re}\{\hat{h}_i \hat{h}_j^* \rho_\alpha(k,n) \rho_p(k')\}$, $i \neq j$, where * indicates the complex conjugate, the function $\text{Re}\{\}$ indicates the real portion of a complex number, $\rho_\alpha(k,n)$ is the cross-correlation of the user and pilot spreading codes for the nth transmitted symbol, $\rho_p(k')$ depends on the baseband filter taps and defines the effect of transmit and receive shaping filters on a transmitted signal, k is a delay defined in integral chips (i.e. k is an integer number) and k' is a delay defined in fractional chips (i.e. k' is a real number). Typically, k' is measured in units of $T_{chip}/M$.

Since the baseband filter taps are known a priori and do not change over time, $\rho_p(k')$ can be determined a priori for all possible values of k' and stored in a lookup table 30. A priori transmitter-receiver shaping filter effect generator 32 determines $\rho_p(k')$ as follows:

$$\rho_p(k') = \int_{-\infty}^{\infty} \alpha(t-k')\beta(-t)dt \qquad \text{Equation 1}$$

where k' typically varies from $-L^{T_{chip}}/_M < k' < +L^{T_{chip}}/_M$ in steps of $T_{chip}/M$, $\alpha(t)$ is the impulse response of the overall transmit shaping filter and $\beta(t)$ is the impulse response of the overall receive shaping filter. Since $\rho_p(k')$ decays as k' increases, L is chosen to indicate that point where $\rho_p(k')$ is very small. In other words, L is chosen such that $\rho_p(L^{T_{chip}}/_M) << \rho_p(0)$. The transmit filter impulse response $\alpha(t)$ is defined in the IS-95 and IS-98 CDMA standards. For IS-95 it is found in section 6.1.3.1.10 "Baseband Filtering" (pages 6–31–6–33 of IS-95-A+TSB74). The receive filter impulse response $\beta(t)$ is a design option and is typically chosen to be equal to $\alpha(t)$ in order to maximize the expected signal to noise ratio. The impulse responses $\alpha(t)$ and $\beta(t)$ are thus known a priori. The output of generator 32 is stored in lookup table 30, per value of k'.

Since all Walsh codes and the entire PN sequence are known a priori (recall that the PN sequence is finite and periodic), and since each symbol is transmitted with N values of the PN sequence, $\rho_\alpha(k,n)$ can also be generated a priori, for all possible values of k and n and stored in a lookup table 34. A priori spreading code cross-correlator 36 determines $\rho_\alpha(k,n)$ as follows.

$$\rho_\alpha(k,n) = \frac{1}{2N}\sum_{m=0}^{N-1} q_{pilot}(m+k,s)q_{user}(m,n)^* \qquad \text{Equation 2}$$

$q_x(m,n) = x\_\text{Walsh}(m)^* PN(m+nN)$ $x = \text{pilot or user}$ $0 \leq m \leq L-1$ per symbol $n$ $-\infty \leq n \leq \infty$ $PN(m+nN+kQ) = PN(m+nN) \ \forall \ m,n,k$ where, as defined in the above equation, the pilot and user Walsh codes q(m,n) are sequences of N chips and PN(n) is a periodic extension of a pseudo-random number sequence of length Q where, for the IS-95 standard, Q is $2^{15}$.

Interference processor 20 additionally comprises a finger cross-talk determiner 38 which receives the estimated channel taps $\hat{h}_i$ and the estimated finger delays $\hat{\tau}_i$ from the channel estimator 14 and utilizes them and the information stored in the two lookup tables 30 and 34 to determine the cross-talk effect of two fingers i,j for the given channel, channel delays and pilot signal.

Specifically, interference processor 20 begins by determining the value of $k_0'$, where $k_0' = \hat{\tau}_i - \hat{\tau}_j$, after which interference processor 20 activates cross-talk effect determiner 38 to determine the cross-talk effect $a_{i,j}(n)$ as follows:

$$a_{i,j}(n) = \sum_{k,k'} Re\{\hat{h}_i \hat{h}_j^* \rho_\alpha(k,n)\rho_p(k')\} \qquad \text{Equation 3}$$

where the sum is performed for all k and k' within the ranges around $k_0'$ defined by $|k-\text{int}(k_0')|<J$ and $|k'-k_0'|<J$, respectively. J is a design parameter and is typically in the range of 1 to 10. It is noted that the delay differences k' and k are stepped by steps of one chip, where all delay difference k' includes the fractional portion of $k_0'$. Thus, if $k_0'$ is, for example, 7.25 chips, then k' might have values of 5.25, 6.25, 7.25, 8.25 and 9.25 and k might have values 5, 6, 7, 8 and 9.

The quantity $a_{i,j}(n)$ can be shown to be an estimate of the interference of the pilot signal along finger i to the user signal at finger j. Any number of fingers can be assumed though three is common. For three fingers, i and j vary from 0 to 2. In the IS-95 standard the Walsh codes are perfectly orthogonal, the term $a_{i,j}(n)$ is identically zero. However, with non-orthogonal codes, this term is generally non-zero.

To calculate $a_{i,j}(n)$, interference processor 20 retrieves the value of $\rho_\alpha(k,n)$ for each value of k and for the nth symbol from lookup table 34 and the value of $\rho_p(k')$ for each value of k' from lookup table 30. Interference processor 20 activates the cross-talk effect determiner 38 for each set (i,j) of fingers where, for each set, the value of $k_0'$ is first determined as are the ranges of k and k'.

Interference processor 20 additionally comprises a finger interference effect determiner 40 and a total interference effect determiner 42. Finger interference effect determiner 40 determines the interference effect $B_j(n)$ per finger as:

$$B_j(n) = \sum_i a_{i,j}(n) \qquad \text{Equation 4}$$

where the sum is performed over the number of fingers in the channel.

Total interference effect determiner 42 determines the total interference effect C(n) as the sum of the $B_j(n)$. The total interference effect C(n) is the output of interference processor 20. As shown in FIG. 3B described in detail hereinbelow, the rake receiver 12 can subtract the individual finger interferences $B_j(n)$ from the individual finger contribution, thereby directly producing the corrected, estimated user data signal x'(n).

It will be appreciated that, by removing the interference effect of the pilot signal, a significant portion, though not all, of the noise which affects the user signal x(n) has been removed, thus increasing the performance quality of optional decoder 18. Furthermore, as can be seen from the discussion hereinabove, the computational burden of interference processor 20 is relatively small, in particular since the two cross-correlations $\rho_\alpha(k,n)$ and $\rho_p(k')$ can be determined a priori and stored in the lookup tables 30 and 34. Alternatively, $\rho_\alpha(k,n)$ can be determined "on-the-fly", from equation 2, since its computation only involves summation on PN "chips" which, in the IS-95 standard, accept only the values of ±1.

Figure 3A:
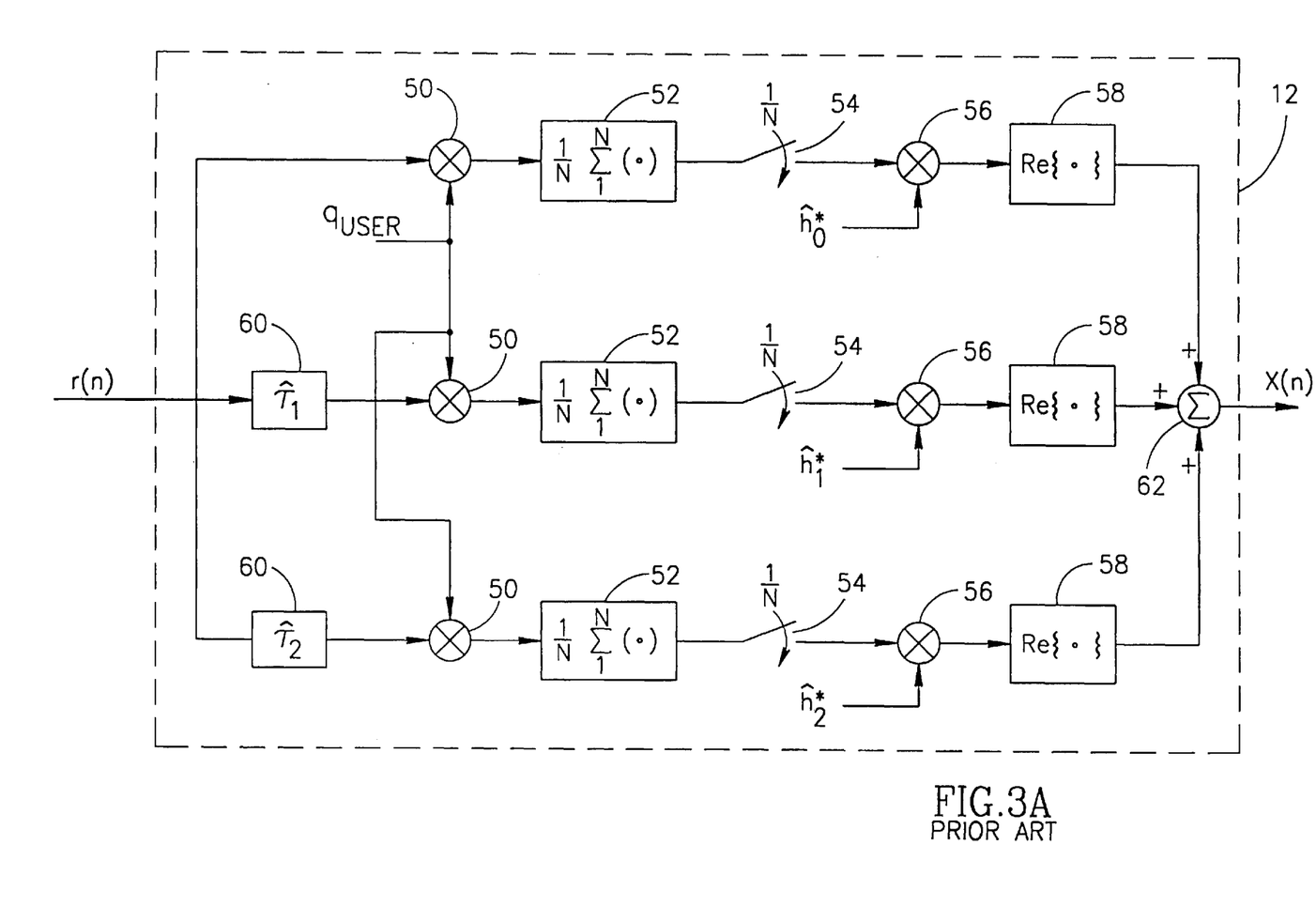
FIG. 3A is a block diagram of a standard prior art rake receiver useful in the data decoder of FIG. 1.
Figure 3B:
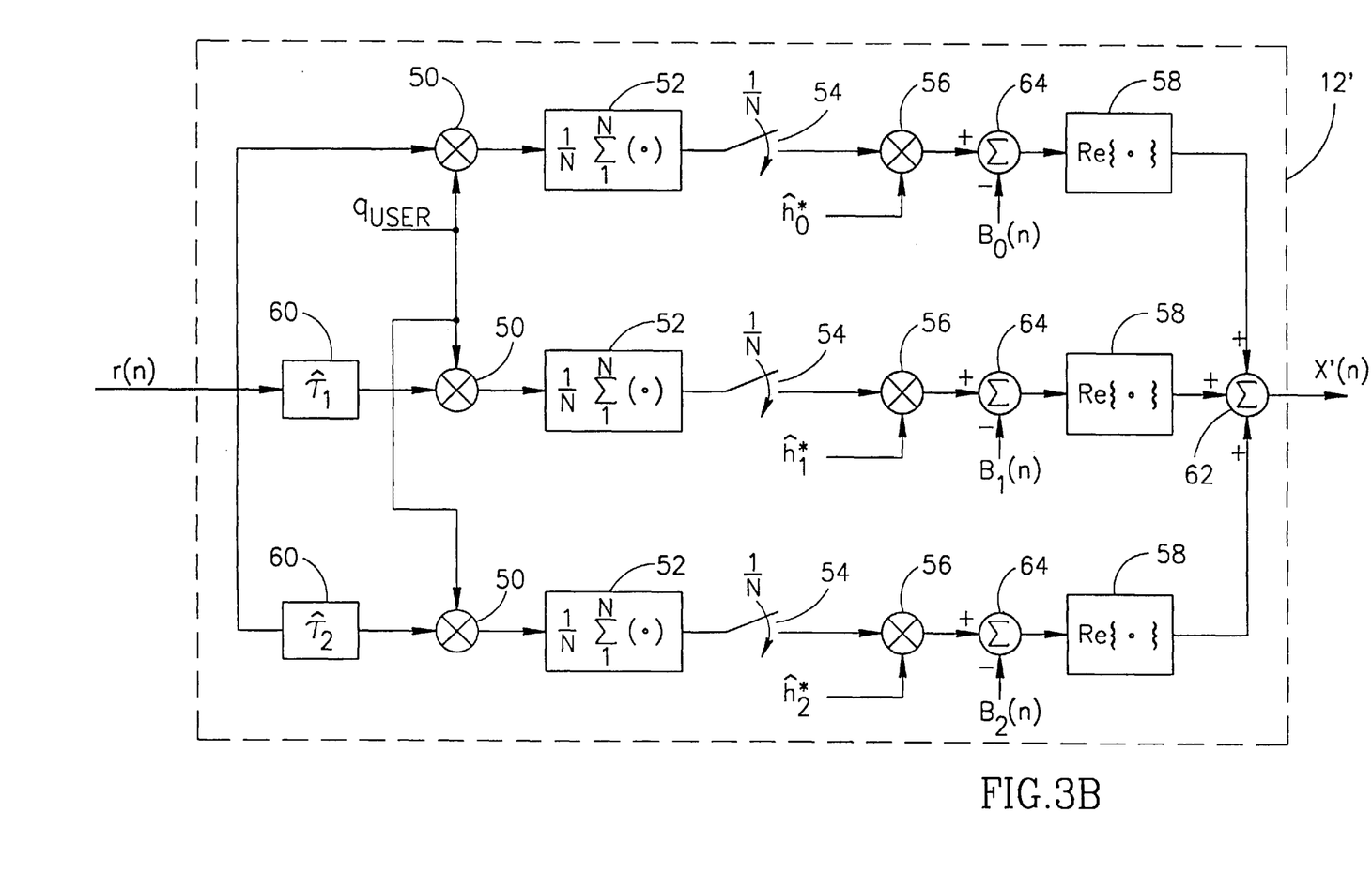
FIG. 3B is a block diagram of a pilot interference removing rake receiver, constructed and operative in accordance with an alternative preferred embodiment of the present invention.

Reference is now briefly made to FIG. 3A which illustrates the elements of rake receiver 12 for a three finger channel and to FIG. 3B which illustrates an alternative version 12' of rake receiver 12 which performs the interference correction therewithin.

Rake receiver 12 has three fingers, each performing approximately the same operation on its associated finger. Each finger includes a despreader 50, a windowing summer 52, a sampler 54, a finger gain multiplier 56 and a complex-to-real converter 58. In addition, the second and third fingers include delays 60.

The first finger, known as the $0^{th}$ finger, serves as the reference finger. The second and third fingers (referred to as the $1^{st}$ and $2^{nd}$ fingers), respectively, have delays defined by $\hat{\tau}_1$ and $\hat{\tau}_2$, respectively, relative to the $0^{th}$ finger. Delays 60 delay the received signal r(n) by their delay relative to the $0^{th}$ finger. For completion, we set $\hat{\tau}_0=0$.

Despreaders 50 despread the received signal r(n) (the $0^{th}$ finger) or the delayed signal (the $1^{st}$ and $2^{nd}$ fingers) via the spreading signal $q_{user}$, defined hereinabove. Windowing summer 52 sums the output of despreaders 50 over a window of N samples and divides the result by N, as indicated. Samplers 54 sample every Nth datapoint. Finger gain multipliers 56 multiply the sampled signal by the complex conjugate of the associated channel tap $\hat{h}_i$. Converters 58 take the real portion of the resultant signal. A summer 62 sums the output of each finger and produces therefrom the data signal x(n).

The rake receiver 12' of FIG. 3B is similar to that of FIG. 3A (and therefore, similar elements carry similar reference numerals) with the addition of three subtractors 64 between their respective multiplier 56 and converter 58. Subtractors 64 subtract the finger interference effect $B_f(n)$ of the relevant finger from the output of the relevant multiplier 56.

It will be appreciated that, in this embodiment, the output of rake receiver 12' is the corrected data signal x'(n).

Figure 4:
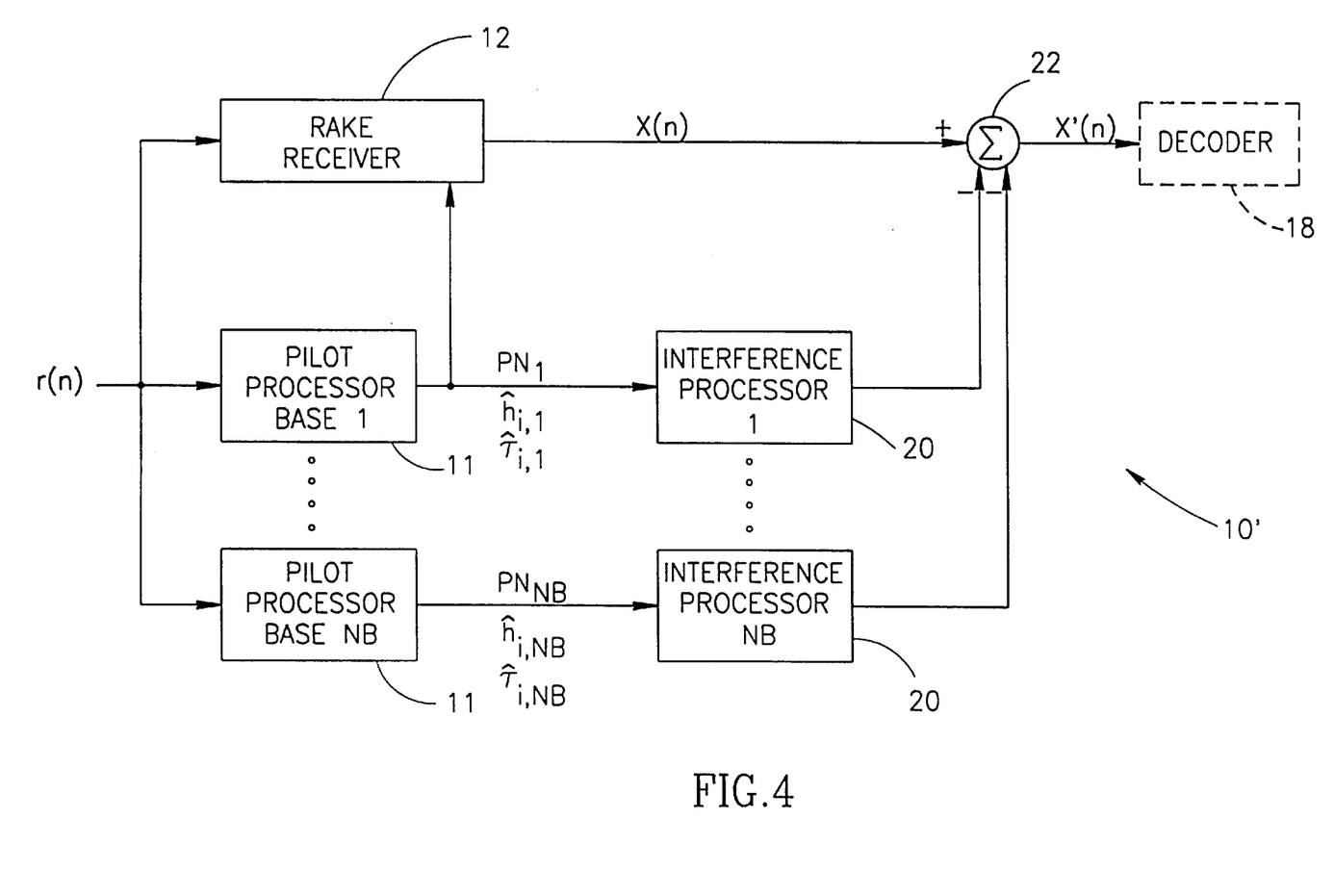
FIG. 4 is a block diagram illustration of an alternative data detector for a mobile unit which removes the interference effect of multiple pilot signals, constructed and operative in accordance with a preferred embodiment of the present invention.

Reference is now briefly made to FIG. 4 which illustrates a data detector 10' capable of reducing multi-pilot interference. The detector of FIG. 4 is particularly useful for mobile units when they are approximately equidistant between two or more base stations. At this position, the mobile units receive the pilot signals of the multiple base stations with approximately equal strength. Both pilot signals interfere with the transmitted data signal.

The data detector 10' is similar to data detector 10 of FIG. 1 in that it includes rake receiver 12, subtractor 22 and optional decoder 18. Data detector 10' also includes a plurality NB of interference processors 20, one per base station that is interfering, and associated pilot processors 11. As described hereinabove, each pilot processor 11 includes a synchronizer, a channel estimator and a delay estimator. However, in data detector 10', each pilot processor 11 synchronizes to the pilot of a different base station and, accordingly, each interference processor 20 generates the interference effect of the pilots of the different base stations. Subtractor 22 removes the multiple interference effect outputs of processors 20 from the data signal x(n) in order to produce the corrected signal x'(n) which optional decoder 18 then decodes.

Figure 5:
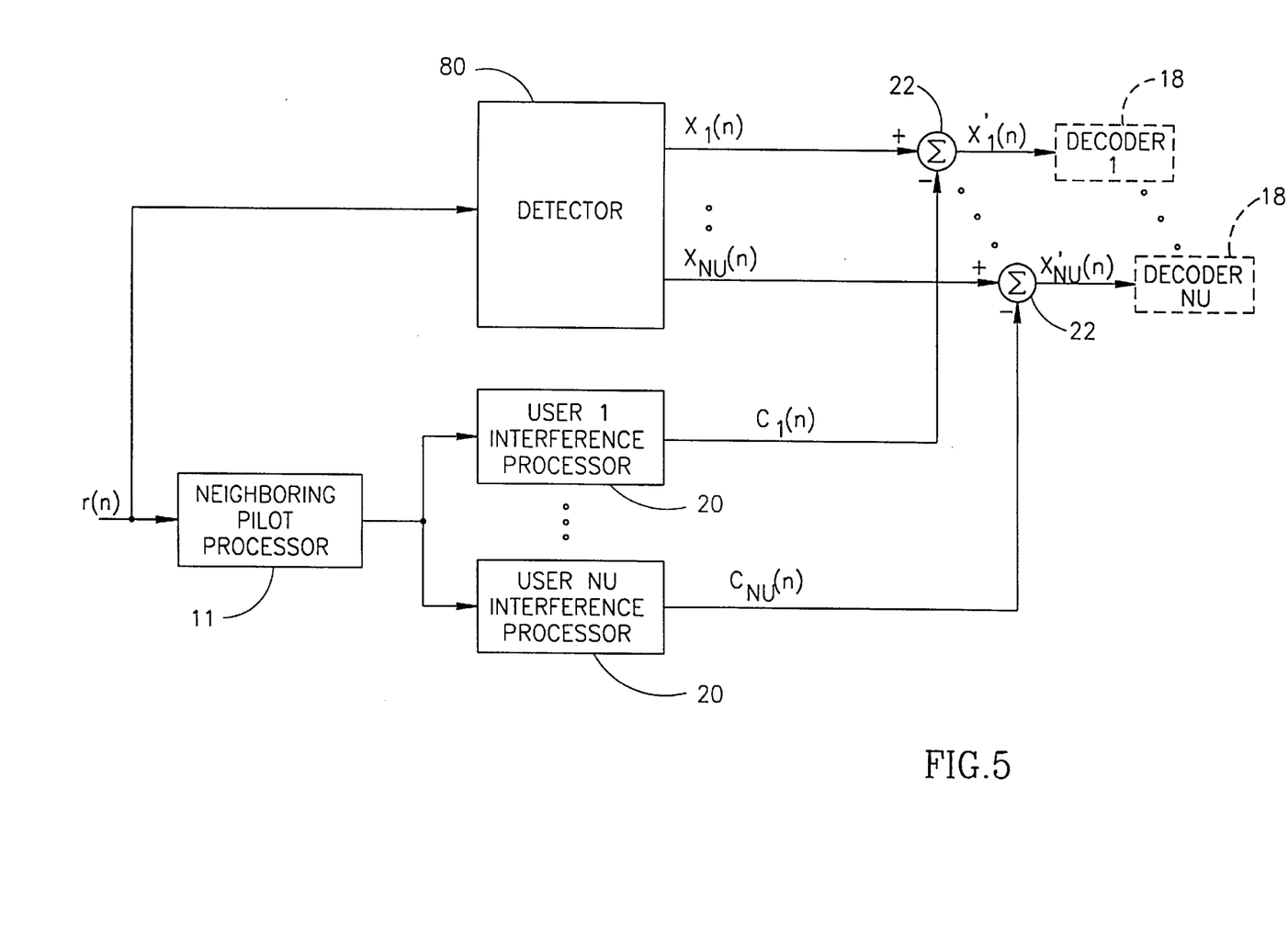
FIG. 5 is a block diagram illustration of a base station multi-user data detector constructed and operative in accordance with a preferred embodiment of the present invention.

It will be appreciated that the pilot and interference processors 11 and 20, respectively can also be incorporated in a base station, for synchronizing to the pilot signal of a neighboring base station and for determining the interference effect of the neighboring pilot signal on each of the plurality NU of user signals which the base station receives. Thus, as shown in FIG. 5, the base station includes a detector 80 which produces NU data signals $x_i(n)$. In accordance with a preferred embodiment of the present invention, the base station includes at least one pilot processor 11 for the neighboring base station's pilot signal and NU interference processors 20, one per user, for determining the interference effect of the neighboring pilot signal on the data signal of each user. The base station also includes NU subtractors 22, one per user, for removing the interference effect $C_i(n)$ of the relevant interference processor 20 from the corresponding data signal $x_i(n)$.

It will be appreciated by persons skilled in the art that the present invention is not limited to what has been particularly shown and described hereinabove. Rather the scope of the present invention is defined only by the claims which follow.

The invention claimed is:

1. An apparatus, comprising:
   a rake receiver to detect a noisy user signal from a received signal;
   at least two or more pilot processors to synchronize to pilot signals of the received signal;
   at least two or more interference processors to couple to said at least two or more pilot processors to determine at least two or more interference effects of the pilot signals on the received signal; and
   a subtractor to remove the at least two or more interference effects of the pilot signals on the received signal.

2. An apparatus as claimed in claim 1, said pilot processors synchronize to the pilot signals of a different base station.

3. An apparatus as claim 1, said interference processors to determine the interference effects of pilot signals of different base stations on the received signal.

4. An apparatus as claimed in claim 3, said interference processors provide a corrected signal to a decoder for decoding a signal corresponding to a pilot signal in the received signal.

5. An apparatus, comprising:
   a CDMA receiver, said CDMA receiver including:
      a rake receiver to produce a data signal in response to a received signal;
      a pilot processor to synchronize to a pilot signal of a neighboring base station;
      an interference processor to determine an interference effect of the pilot signal of the neighboring base station on the received signal; and
      a subtractor to remove the interference effect of the pilot signal of the neighboring base station determined by said interference processor from the data signal produced by said rake receiver.

6. An apparatus as claimed in claim 5, said rake receiver to produce at least two or more data signals in response to a the received signal, and further comprising at least two or more interference processors to determine an interference effect of at least two or more pilot signals from at least one or more neighboring base stations on the received signal, and at least two or more subtractors to remove the interference effect of the at least two or more pilot signals from the at least two or more data signals.

7. A method, comprising:
   producing a data signal in response to a received CDMA signal;
   detecting pilot signals in the received signal;
   determining an interference effect of an undesired pilot signal on the received signal; and
   subtracting the interference effect of the undesired pilot signal from of the data signal.

8. A method as claimed in claim 7, wherein the interference effect of the undesired pilot signal is caused by a pilot signal from a neighboring base station.

9. A method as claimed in claim 7, wherein the interference effect of the undesired pilot signal is caused by a pilot signal from a neighboring user.

* * * * *